Figure 1:
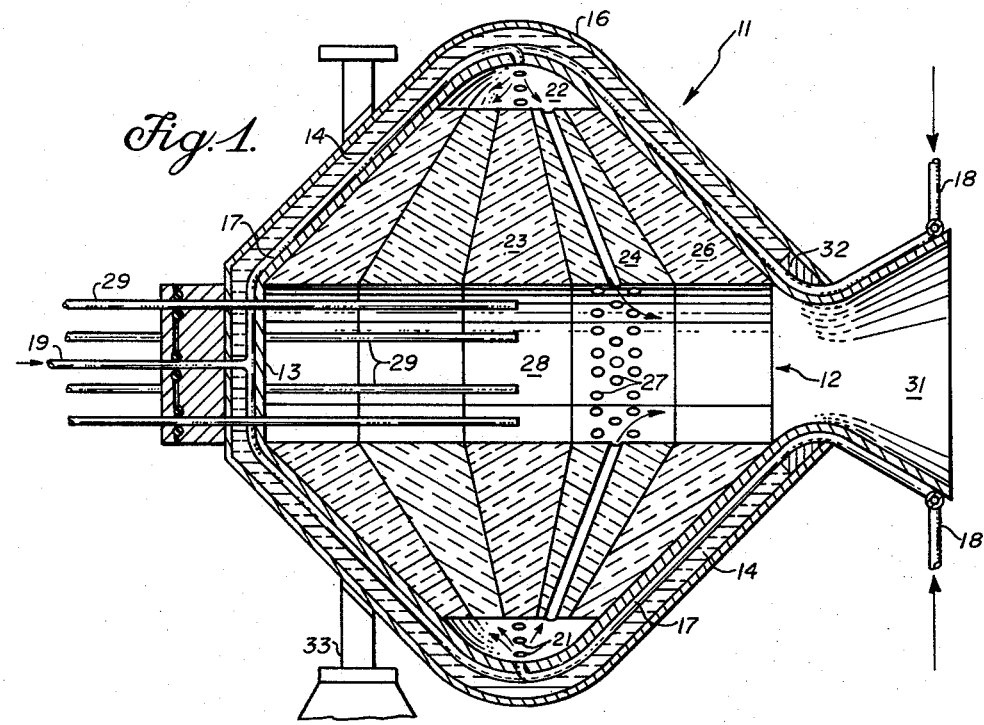

Sept. 22, 1964    R. H. FOX    3,150,054
HIGH FLUID FLOW RATE NUCLEAR REACTOR
Filed May 18, 1962

INVENTOR.
ROBERT H. FOX
BY
ATTORNEY 3,150,054
HIGH FLUID FLOW RATE NUCLEAR REACTOR
Robert H. Fox, Livermore, Calif., assignor to the United States of America as represented by the United States Atomic Energy Commission
Filed May 18, 1962, Ser. No. 197,170
6 Claims. (Cl. 176—59)

The present invention relates to nuclear reactors and, more particularly, to nuclear reactors for applications requiring high gaseous or liquid flow rates through solid reactor core.

Because of their refractory nature, thermal stability, and good moderating and low neutron absorption properties, graphite, ceramics and carbides are widely used in the nuclear reactor field, particularly in reactor cores. These materials, however, as well as some of the metals commonly used in reactor cores, have relatively low tensile strengths. For instance, at room temperatures graphite has a tensile strength of just 3000 p.s.i. and beryllium oxide, a commonly used ceramic, has a tensile strength of only 14,000 p.s.i.

In reactor applications requiring high fluid flow rates through a reactor core, e.g., in nuclear propulsion reactors, these low tensile strengths have given rise to major design problems. Large tensile forces stemming from pressure drop and frictional drag along flow channels of cores composed of the above-mentioned materials tend to break apart and disintegrate these cores. In the present axial flow cylindrical reactors used for rocket and jet propulsion, these forces amount to at least 20% of the expected thrust.

Besides tending to break apart nuclear propulsion reactor cores, these forces also tend to force the core out of the vehicle. Thus, in the usual design, some strong mechanical support must be provided to both prevent the core from fracturing and keep it within the vehicle.

One method considered in the past for providing this support has been to provide a strong, structurally supported base plate between the core and the vehicle nozzle. However, most materials structurally strong enough at high temperatures for use as base plates have too high of a neutron absorption cross section to permit their use. Thus the art has been generally limited to the use of graphite, ceramics, or carbides for base plates with again the problem of tensile stresses being presented and a resulting limitation on the core power density and amount of thrust possible.

Another proposed method of alleviating these problems is to "hang" the core in the vehicle. Tension rods rigidly attached above the core are passed therethrough and support a holding plate beneath the core. But again there is a limitation on the core power density because of the high neutron absorption cross section of the materials strong enough at high temperatures to be used for the support members.

The present invention reduces or completely eliminates the need to rely on strong support members to counteract these forces. The forces themselves are used to support the core. The invention comprises a reactor core in which the flow passage channels through the reactor core are convergent in at least one inward direction. The pressure drop forces and frictional drag forces thus become compressive forces rather than tensile forces. In the preferred embodiment of the invention, a nuclear rocket engine, the flow channels converge inwardly in the radial direction from the core periphery to a central cylindrical void. Thus, the pressure drop forces and the frictional drag forces caused by flow through these channels are directed to the center of the core and keep the core in compression. As will be seen more clearly infra, besides eliminating the tensile force problems, the changing of these forces to compressive forces also has inherent advantages. For instance, putting the core in compression also eliminates the need for external support to hold the various sectional blocks of the core together. Ideally, in a spherical core having flow channels radially converging throughout it to a central spherical void, it should not be necessary to provide any external support for the core whatsoever.

It is not necessary for the invention, that any particular "amount" of convergence be present although the force placing the core in compression is directly related to the convergence of the channels. However, a convergence of at least 30% is preferred. A particular "percentage" of convergence is hereby defined as that convergence of the channels for any core geometry which results in that percentage of the total flow force on the core being a compressive force. Thus, in a cylindrical reactor core having a convergence of 30%, at least 30% of the total forces caused by the passage of fluid through the core is radially directed transversely toward the axis of the reactor core.

It is therefore an object of the present invention to provide an improved nuclear reactor core especially adapted for the passage of a fluid therethrough at a high flow rate.

Another object of the present invention is to provide a nuclear reactor core made of a solid material in which pressure drop and frictional drag forces caused by the passage of fluid therethrough cause little or no tensile stress on the core.

One other object of the present invention is to provide a nuclear reactor core of a solid material which is held in compression by the passage of a fluid at a high flow rate through flow channels convergent in at least one direction.

A further object of the present invention is to provide a solid nuclear reactor core adapted for the passage of a fluid therethrough at a high flow rate and in which the need for structural support structure is minimized.

Still another object of the present invention is to provide a nuclear reactor core of a solid material in which flow passage channels are radially convergent to a central void.

Figure 2:
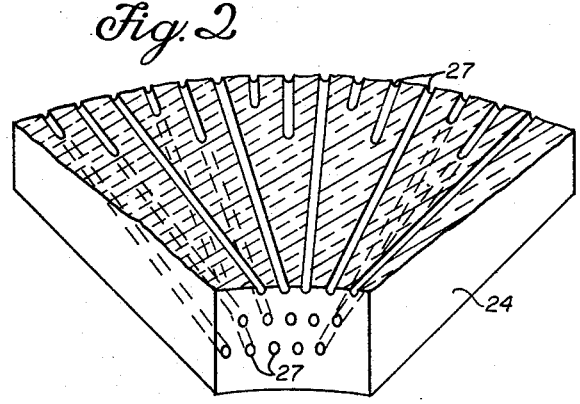

Other objects and advantages of the invention will be apparent to those skilled in the art upon consideration of the following description with reference to the appended drawings in which:

FIGURE 1 is a cross-sectional plan view of a preferred embodiment of the invention; and FIGURE 2 is an isometric cutaway view of one of a plurality of graphite blocks making up the core of the preferred embodiment of FIGURE 1.

Referring now to FIGURE 1, there is shown a nuclear rocket engine 11 comprising an uranium impregnated graphite core 12, pressure shell 13, graphite reflector 14, and outer vessel 16. A solid array of gas introduction tubes 17 fill a void between the reflector 14 and the pressure shell 13. Gas inlet pipes 18 and 19 are provided for the introduction of a propulsion gas from conventional storage tanks (not shown) into the tubes 17. An annular row of inlets 21 from these tubes 17 communicate with an annular manifold section 22 between the pressure shell 13 and core 12. These inlets 21 are arranged such that they communicate alternately with the tubes having inlets 18 and those having inlets 19.

As can be seen, the geometry of the core 12 is the same as would be generated by the revolution of an isosceles trapezoid about an axis parallel to and distant from its longer base. The core is comprised of massive graphite blocks, e.g., 23, 24, and 26, one of which, 24, is shown cut away in FIGURE 2. These blocks do not have to be of graphite but could be any of the commonly used ceramics or carbides, e.g., beryllia, uranium oxide, uranium carbide or plutonium oxide.

In keeping with the invention, flow channels 27 pass inwardly through the core from manifold section 22 to a central cylindrical void 28 and are convergent in the radial direction. For simplicity, only one row of these channels are shown, but it is to be understood that channels penetrate throughout the core volume.

As can be seen most clearly in FIGURE 2, a row of channels beginning in one transverse plane at the periphery of the core are in three transverse planes at the interior of the core. Thus, sufficient channels may be provided through the core without the necessity of limiting the radial thickness of it to prevent adjacent channels from merging. Because of this, these channels diverge somewhat in the axial direction and some tensile force is thus produced on the core. However, the pressure shell, being of a thickness capable of withstanding the gas inlet pressure, is able to counteract this force without further structural support. However, if it is desired for a higher power/weight ratio to reduce the thickness of the pressure shell where it is not subjected to the full gas pressure, i.e., along the conical sides of the core, it will be necessary to provide structurally connected stainless steel rings at both axial ends of the cylindrical void 28 to counteract this tensile force.

A plurality of control rods 29, four of which are shown, penetrate into void 28 through the forward end of the pressure shell 13. These rods 29 consist of pellets or rods of a material having a high neutron absorption cross section enclosed by a thin tubular metal jacket. Conventional control rod drives, e.g., ball and screw type, (not shown) are provided to drive these rods.

The pressure shell 13 is extended beyond the core and forms an exhaust nozzle 31. A stainless steel ring 32 is provided to strengthen the throat section of this nozzle 31. A plurality of radial structural members (not shown) extend from ring 32 between tubes 17 to the throat section of the nozzle 31.

A plurality of supporting members 33 to transmit the thrust of the reactor to the vehicle are rigidly attached to the outer vessel as shown.

For optimum neutron economy and the achievement of high power density, it is preferred that the radius of the core, i.e., to the manifold section, be three times the radius of the cylindrical void and one-half the axial length of the core. The axial length of the core at the void should be 3 times the axial length at the manifold section. Thus, the surface area of the core in the void will be equal to that in the manifold section and it will not be necessary to taper the channels 27. To ensure a uniform pressure drop along the cylindrical void 28, the throat section of the nozzle should have a radius .694 times the radius of the void 28. With these relationships, the manifold section, which is at the high inlet pressure, only comprises 27% of the pressure shell.

In the operation of this preferred embodiment of the invention, a propulsion gas, e.g. hydrogen, is introduced at a low temperature and high pressure through inlets 18 and 19 into tubes 17. The gas, as it flows through these tubes 17, provides cooling for the pressure shell 13 and the reflector 14. The gas then enters the high pressure manifold section 22 through inlets 21.

From the manifold section 22, the gas flows through channels 27 where it is heated and expanded by the transfer of heat from the reactor core. As can be seen, all the pressure drop forces and most of the frictional drag forces are generated during passage of the gas through these channels. Since the channels are inwardly convergent in the radial direction, these forces are primarily compressive forces, thus reducing the tensile stress on the core and eliminating any tendency for the core to leave the pressure vessel. In addition, there is no need to provide structural support in the transverse direction to hold the graphite sections of the core, e.g., blocks 23, 24, and 26, together.

After passing through the flow channels 27, the gas enters the cylindrical void 28 and flows out the nozzle 31 thus providing the desired propulsion. It should be again noted that there is no pressure drop along cylindrical void 28, but only in channels 27 and at the nozzle 31.

The following table provides the dimensions, parameters, and characteristics of an operation embodiment of a reactor incorporating the present invention and having a nuclear grade graphite core impregnated with $U^{235}$. The concentration is linearly shaded from the cylindrical void to the manifold section of the core. The propulsion gas is hydrogen and the control rods consist of boron carbide rods canned in stainless steel.

*Table I*

| | |
|---|---|
| Core radius | 3 ft. |
| Core height at cylindrical void | 6 ft. |
| Core height at manifold section | 2 ft. |
| Total core volume | 141.24 cu. ft. |
| Cylindrical void radius | 1 ft. |
| Flow channel diameter | .25 in. |
| Nozzle throat radius | .694 ft. |
| Pressure shell thickness | .5 in. |
| Reflector thickness | 3 in. |
| Outer shell thickness | .25 in. |
| Cylindrical void volume fraction | .30. |
| Flow channel volume fraction | .10. |
| Total void volume fraction | .40. |
| Concentration (C/U): | |
|    Inner periphery | $10^3/1$ wt. percent. |
|    Outer periphery | $2 \times 10^3/1$ wt. percent. |
| Number of control rods | 6. |
| Control rod diameter | .25 in. |
| Gas inlet temperature | $-173°$ C. |
| Gas outlet temperature | $<1500°$ C. |
| Gas inlet pressure | 1300 p.s.i. |
| Cylindrical void gas pressure | 1000 p.s.i. |
| Core power density | $\approx 170$ MW/ft.$^3$. |
| Flow rate | $\approx 2.3$ long tons/sec. |
| Thrust | $\approx 3 \times 10^6$ lbs. |

As can be seen, a reactor designed according to the present invention can have a much higher core power density than is possible with conventional designs.

The invention is not limited to the specific design described. However, it is necessary for a plurality of gas flow channels to be convergent in at least one direction. Since for jet engine purposes it is preferred that the gas stream be incident on the forward section of the reactor, a hollow dome or hemispherical shape would be preferred. The flow channels then converge toward the center or center line of the core and thus keep it in compression. It would also be possible to have radially converging flow channels from the periphery of a cylindrical reactor to a central void. Converging channels may also be utilized in fast reactors. Their use is not just limited to cores of materials having low tensile strengths. Rather than having an impregnated core, fuel elements could be provided either within the flow channels themselves or otherwise within the core.

Thus, although a particular embodiment of the invention has been disclosed, various modifications and other designs employing the present invention will be apparent to those skilled in the art. Therefore, the scope of the invention is only to be limited by the appended claims.

What is claimed is:

1. In a nuclear propulsion reactor, a reactor core comprising a solid material impregnted with fissile fuel material, said core having a shape substantially that generated by the revolution of an isosceles trapezoid about an axis parallel to and at a distance from the longer base of said trapezoid with the inner periphery of said core defining a central void, said core having a plurality of gas flow channels passing therethrough from the periphery of said core generated by the shorter base of said trapezoid to the central void defined by the iner periphery of said core, said channels being convergent in the radial direction.

2. A nuclear propulsion reactor according to claim 1 in which said solid material is selected from the group consisting of graphite, beryllia, uranium carbide, uranium oxide and plutonium oxide.

3. A nuclear propulsion reactor according to claim 1 in which said material is graphite and is impregnated with $U^{235}$, and said gas flow channels are adapted for the flow of hydrogen gas therethrough.

4. A nuclear propulsion reactor according to claim 1 in which said channels that are in one transverse plane at the outer periphery of said core are in three transverse planes at the inner periphery of said core.

5. A nuclear propulsion reactor according to claim 1 in which the concentration of said fissile material is transversely shaded linearly from the outer periphery of said core to the inner periphery of said core.

6. A nuclear propulsion reactor according to claim 1 in which the radial distance from the axis of said core to the outer periphery of said core generated by said shorter base is about three times the radial distance to the inner periphery of said core and about one-half the axial length of the inner periphery of said core, and the axial length of the inner periphery of said core is about three times the axial length of the outer periphery of said core generated by said shorter base.

References Cited in the file of this patent

UNITED STATES PATENTS

| 2,917,443 | Grebe | Dec. 15, 1959 |
| 3,070,530 | Metcalf | Dec. 25, 1962 |

FOREIGN PATENTS

| 813,723 | Great Britain | May 21, 1959 |

OTHER REFERENCES

Propulsion Systems for Space Flight, W. R. Corliss, McGraw-Hill Book Co., New York, 1960, pp. 154–167.

Rocket Science, vol. 3–4 qtly., pp. 88–91, pub. date December 1949, The Atomic Rocket Motor, Part III by M. G. Whybra.

Benzer: (Germany) Deutsches Patenamt Auslegschrift 1,095,959, D29516, VIIIc/21g Anmelding: Dec. 3, 1958; Ausgabe: Dec. 24, 1960.